United States Patent [19]

Mucheyer

[11] Patent Number: 4,625,747
[45] Date of Patent: Dec. 2, 1986

[54] PRESSURE RESPONSIVE FLOW DIVIDER VALVE FOR SERVO-POWERED STEERING DEVICES

[75] Inventor: Norbert Mucheyer, Rechtenbach, Fed. Rep. of Germany

[73] Assignee: Mannesmann Rexroth GmbH, Lohr, Fed. Rep. of Germany

[21] Appl. No.: 705,977

[22] Filed: Feb. 27, 1985

[30] Foreign Application Priority Data

Mar. 10, 1984 [DE] Fed. Rep. of Germany ........ 3408864

[51] Int. Cl.$^4$ ............................................. G05D 11/03
[52] U.S. Cl. ..................................... 137/101; 137/117
[58] Field of Search .................. 137/101, 117; 417/300

[56] References Cited

U.S. PATENT DOCUMENTS 2,859,762 11/1958 Banker ................................. 137/101

FOREIGN PATENT DOCUMENTS 1163621 2/1964 Fed. Rep. of Germany ...... 137/101

Primary Examiner—Robert G. Nilson
Attorney, Agent, or Firm—Harness, Dickey & Pierce

[57] ABSTRACT

A pressure responsive flow divider valve for servo-powered steering devices comprises a flow control valve having three ports to divide the fluid flow delivered by a pump between a pair of partial volumes, one flowing to the steering valve and the other flowing to a further hydraulic load. When the steering device is not operated, the further load is primarily supplied with fluid, while the flow to the load is reduced, but the steering valve is fully supplied when the steering device is actuated. The valve comprises a valve member which is actuated in response to pressure to change the cross section of the throttle in the flow control valve so that the steering valve is supplied with a relatively small volume of fluid when the steering device is not operated, whereas the valve member is shifted by a pressure increase when the steering device is actuated to supply an increased fluid flow to the steering valve as required. The valve according to the invention allows to reduce energy to drive the pump.

5 Claims, 3 Drawing Figures

PRESSURE RESPONSIVE FLOW DIVIDER VALVE FOR SERVO-POWERED STEERING DEVICES

BACKGROUND OF THE INVENTION

Recently, agricultural tractors and machinery are equipped with hydrostatic steering devices, thus eliminating mechanical connections between the steering wheel and the steering axis. Conventionally the hydrostatic steering device is operated in the so-called open centered, hydraulic mode. A flow control valve is placed between the pressure source and a steering valve to maintain constant the volume of fluid flowing through the steering device when the speed of the drive engine varies. Any volume of fluid branched off from the pump flow and not supplied to the steering valve is fed to a further hydraulic system which is connected to a hydraulic load.

Steering valves including load sensing means are known. The priority valve to branch off the fluid flow from the pump is a pressure-compensated valve means. As long as the steering device is not operated, the pressure-compensated valve supplies the full pump flow to the hydraulic load, except a very small control fluid flow which is fed through the load sensing line to a land of the steering valve piston. When the steering device is operated, the control flow in the load sensing line is changed by said piston land so that the valve feeds a volume of flow to the steering valve corresponding to what is required for the steering operation.

SUMMARY OF THE INVENTION

It is an object of the present invention to provide an improved hydraulic apparatus to operate the steering device.

In particular, it is an object of the present invention to improve the flow control valve to feed the largest possible fluid volume to the further hydraulic system when the steering device is not operated, whereas the fluid volume required for the steering valve is immediately provided for when the steering device is actuated.

According to the invention there is provided a pressure responsive flow divider valve for servo-powered steering devices, in particular for hydrostatic steering devices of agricultural tractors and machinery, which flow divider valve is placed between a pressure source and a steering valve, said flow divider valve comprising a control piston including control lands to control the fluid flow from said pressure source to a first port connected to said steering valve and to a second port connected to a further hydraulic load, further comprising a throttle located between said first and said second port, wherein said control piston is displaced in response to the pressure difference between the pressure of said pressure source and the pressure at said steering valve, said pressure difference occurring across said throttle so that the volume of fluid flowing to said further load is increased and the volume of fluid flowing to said steering valve is decreased when the steering device is not operated, whereas the volume of fluid flowing to said steering valve is increased and the flow to the further system is decreased when the steering device is actuated, the improvement comprising a valve member which is provided to change the cross sectional area of said throttle in said flow divider valve, said valve member being actuated by the increased pressure upstream of said throttle to increase the cross sectional area thereof when said steering device is actuated and the pressure is increased thereby.

According to the invention, the flow control valve is operated in response to pressure so that the pressure increase resulting from actuating the steering device acts to increase the cross section of the throttle bore in the flow control valve to supply the volume of fluid required by the steering device. As long as the steering device is not actuated, the cross sectional area of the throttle is reduced by said valve member, to keep the volume of fluid which is fed to the open center steering valve at a minimum, while the volume of fluid fed to the additional hydraulic system is at a maximum. According to the invention the novel system is of simple structure. In particular, the conventional steering valve can be used without structural change. Furthermore, an additional load sensing line may be dispensed with.

BRIEF DESCRIPTION OF THE DRAWING

An embodiment of the invention is described below with reference to the accompanying drawing which shows.

DETAILED DESCRIPTION OF THE PREFERRED EMBODIMENTS

Figure 1:
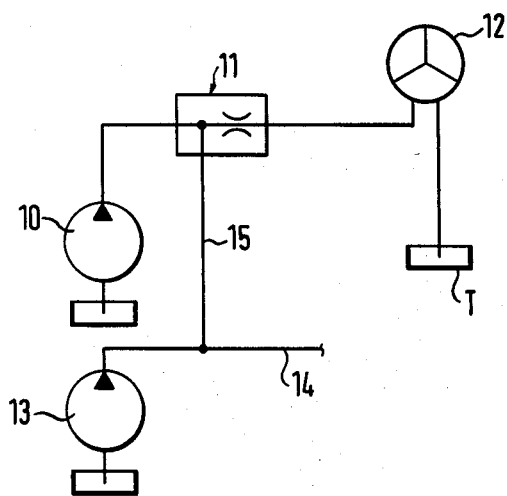
FIG. 1 is a hydraulic diagram of a servo-powered steering device including a flow control valve and a hydraulic system.

In FIG. 1, a pump 10 feeds a fluid flow through a flow divider valve 11 to a steering valve 12 of a servo-powered steering device for an agricultural tractor. The pump 13 delivers fluid through a line 14 to a further hydraulic system, for example to operating cylinders of the tractor (not shown).

The servo-powered steering device is operated in the open center mode, i.e. a relatively small volume of fluid delivered by the pump 10 continuously flows to the reservoir T via the steering valve 12, when the steering device is not actuated. The larger portion of the fluid delivered by the pump 10 is branched off in the flow divider valve 11 and is fed via the line 15 to the line 14 to increase the volume of fluid delivered by the pump 13 and fed to the additional hydraulic load.

When the steering device is actuated, the pressure in the line between the pumpe 10 and the steering valve 12 increases, wherein the flow control valve 11 is actuated in response to pressure. From this follows that the volume of fluid to the steering valve 12 required for operating the steering device is increased and the volume of fluid in the line 15 flowing to the additional hydraulic load is reduced. Accordingly the volume of fluid delivered by the pump 10 is used to feed the hydraulic load through the line 14 when the steering device is not operated, while the flow divider valve 11 is actuated when the steering device is operated to increase the volume flowing to the steering valve 12 to the required amount so that the steering device may be operated fast enough.

Figure 2:
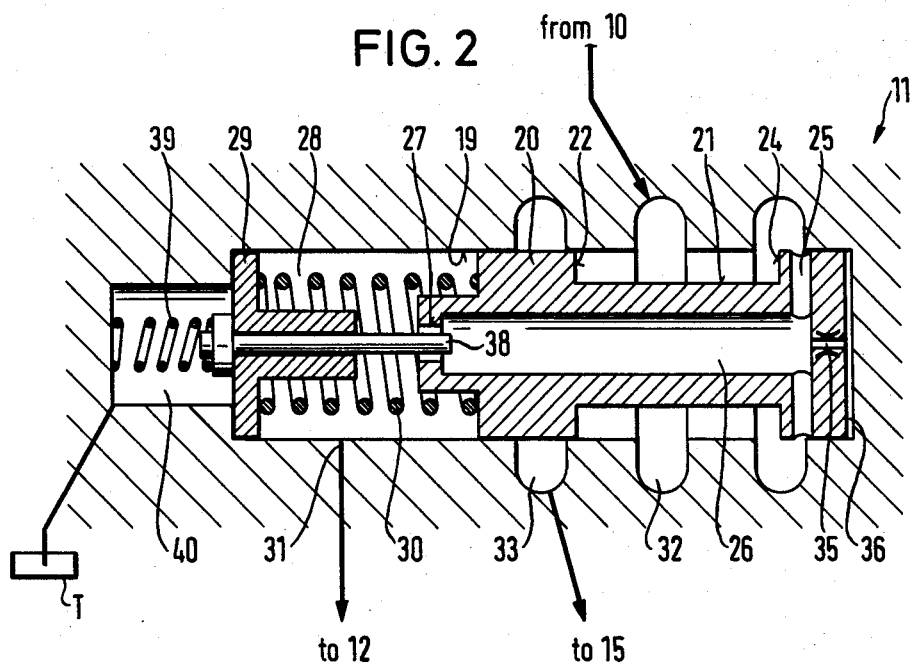
FIG. 2 is a section through a flow divider valve in a first embodiment of the invention and FIG. 3 is a section through a flow divider valve in a further embodiment.

FIG. 2 shows a preferred embodiment of the flow divider valve according to the invention. The valve housing comprises a bore 19, in which a control piston 20 is slidingly received, which piston is provided with an annular groove 21 defining a pair of opposite shoulders 22 and 24, of which shoulder 22 defines a control edge towards the line 15 and the shoulder 24 a control edge towards pump pressure. Pressure medium may enter a central bore 26 through radial bores 25 in the piston 20 adjacent the control edge 24, which bore 26 is connected via a throttle bore 27 to a chamber 28 which houses a spring 30 supported on a spring supporting member 29. The spring 30 engages the piston 20 towards the right in the drawing. A first outlet port 31 leading to the steering valve 12 opens into chamber 28. An inlet port 32 which is connected to the pump 10 opens into the annular groove 21 of the piston. A second outlet port 33 is connected to the line 15 leading to the further hydraulic load. The central bore 26 in the piston 20 is connected to the space 36 via throttle 35.

A rod-like valve member 38 is slidably arranged in a bore of the spring supporting member 29 which valve member is urged by a spring 39 in contact with the member 29. The spring 39 is housed in a chamber 40 connected to reservoir. In the position shown, the valve member 38 extends through the throttle bore 27. The cross sectional area of the throttle is defined by the annular gap between the valve member 38 and the bore 27. When the valve member 38 is shifted to the left out of the throttle bore 27 in opposition to the force of the spring 39, the cross sectional area of the throttle is increased to the cross section defined by the bore 27.

FIG. 1 shows a flow divider valve having three line ports comprising a pressure responsive change-over valve to increase the fluid volume flowing to the steering valve. The valve operates as follows:

When the steering device is not operated, there is low pressure in the chamber 28 leading to the steering valve 12, and the control piston 20 is shifted to the left by the pump pressure in the chamber 36. Accordingly, a substantial portion of the volume delivered by the pump 10 inflows, past the control edge 22 to the second outlet port 33 and to the line 15 and the hydraulic system. When the speed of the combustion engine driving the pump 10 is increased resulting in an increased pressure, for example, more fluid flows to the line 15. Vice versa, the flow to line 15 past the control edge 22 is reduced when the volume of fluid delivered by the pumpe 10 decreases. In this way the volume of fluid flowing to the steering valve is maintained substantially constant in response to the pressure difference between the pressure in the central port 26 and the chamber 28. The volume of fluid flowing to the steering valve 10 is relatively small due to the cross section of the throttle defined by the annular gap between the valve member 38 and the bore 27 in the piston 20. The volume of fluid flowing to the line 15 and to the hydraulic system is relatively high.

However, when the steering device is actuated, the pressure in the steering valve 12 and thus in the chamber 28 substantially increases. Correspondingly the pump pressure increases and thus the pressure in the central bore 26 of the piston 20. This pressure acts on the endface of the valve member 38. As soon as the fluid pressure on the rod 38 exceeds the force of the spring 39, the valve member 38 is shifted to the left and the full cross section of the bore 27 becomes free. In this case the volume of fluid flowing to the outlet port 31 and to the steering valve 12 is increased to the volume required for actuating the steering device which can be operated rapidly.

Figure 3:
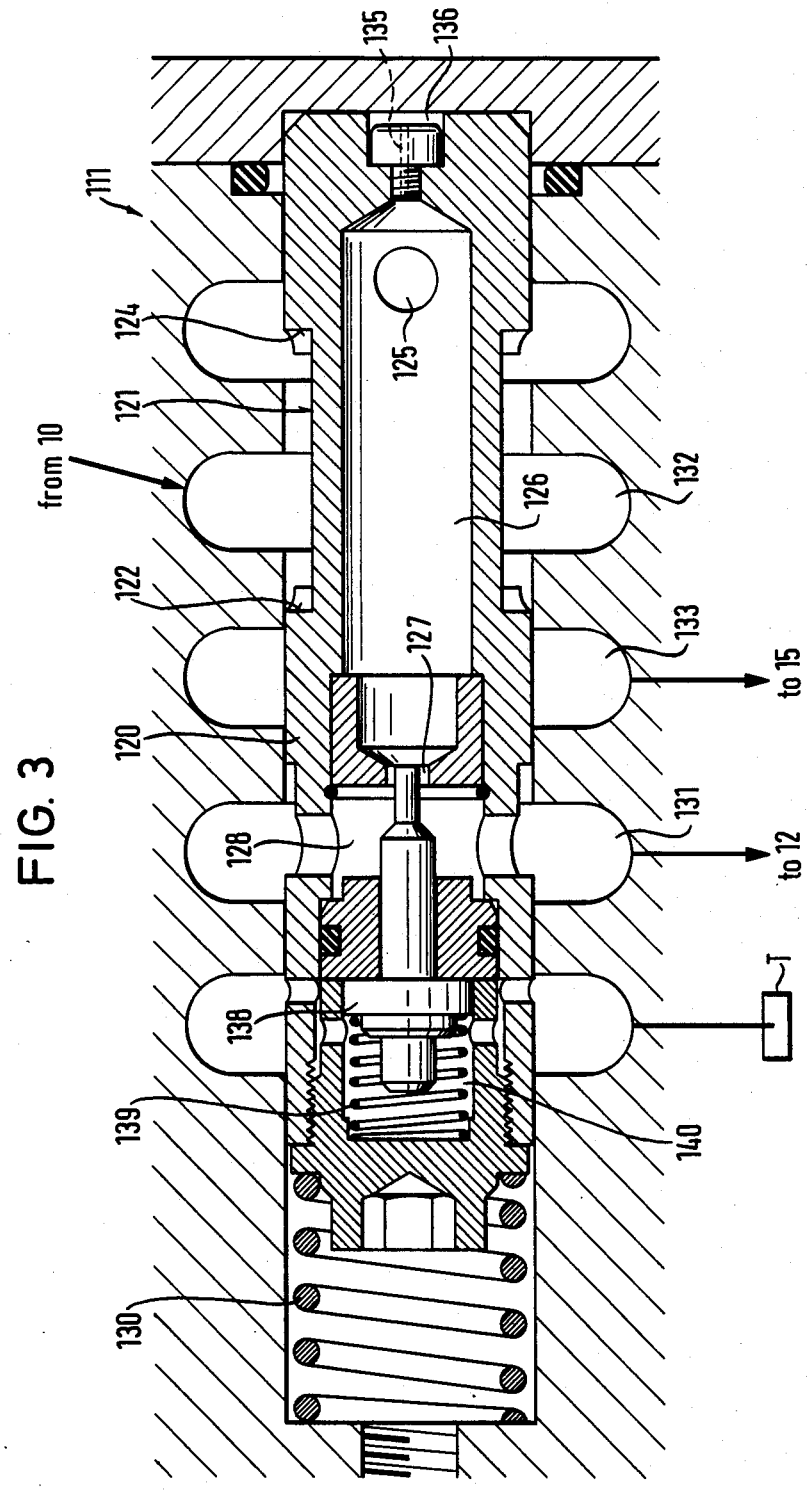

FIG. 3 shows an alternative embodiment of the flow control valve 111. Identical members are designated with identical reference numerals but having a prefix "1".

The difference compared with FIG. 2 should be seen in the feature that the valve member 138 is embodied in the control piston 120. The valve member 138 is urged to the position shown by the spring 139 which is located in a hollow space 140 of the piston connected to the reservoir. When the pressure in the central bore 126 of the control piston 120 is increased, when the steering device is operated, the force of the spring 139 is overcome at a predetermined pressure point so that the valve rod 138 is shifted back to freely open the full cross section of the throttle bore 127.

The embodiment of FIG. 3 has the advantage that the level of actuating the valve member 138 is independent of the position of the control piston 120.

What is claimed is:

1. A pressure response flow divider valve for servo-powered steering devices, in particular for hydrostatic steering devices of agricultural tractors and machinery, which flow divider valve is placed between a pressure source and a steering valve, said flow divider valve comprising a control piston including spaced control lands to control respectively the fluid flow from said pressure source to a first port connected to said steering valve and to a second port connected to a further hydraulic load, further comprising a throttle located between said pressure source and said steering valve, said control piston being displaced in response to the pressure difference between the pressure of said pressure source and the pressure in said steering valve, said pressure difference occurring across said throttle, so that the volume of fluid flowing to said further system is increased and the volume of fluid flowing to said steering valve is decreased when the steering device is not operated, whereas the volume of fluid flowing to the steering valve is increased and the fluid flowing to the further load is decreased, when the steering device is actuated, characterized in that a valve member is provided to change the cross sectional area of said throttle, said valve member being directly actuated by the pressure upstream of said throttle to increase the cross sectional area of the throttle upon the actuation of said steering device.

2. The flow divider valve of claim 1, wherein the control piston comprises a central bore communicating with said pressure source via an inlet port, said bore opening through a throttle bore into a chamber connected to the steering valve, wherein said valve member is located in said throttle bore to comprise said throttle, said valve member being shifted back by the increased pressure against a spring force so that the cross section defined by the diameter of said throttle bore becomes unrestricted.

3. The flow divider valve of claim 2, wherein the valve member is supported in the housing of the valve.

4. The flow divider valve of claim 2, wherein the valve member is supported in the control piston.

5. The flow divider valve of claim 1, wherein the side of the valve member opposite the throttle bore is connected to the reservoir.

* * * * *